May 21, 1957 P. L. CIACCIO 2,793,060
COUPLERS FOR FLEXIBLE SEWER ROD TRAINS
Filed June 15, 1953
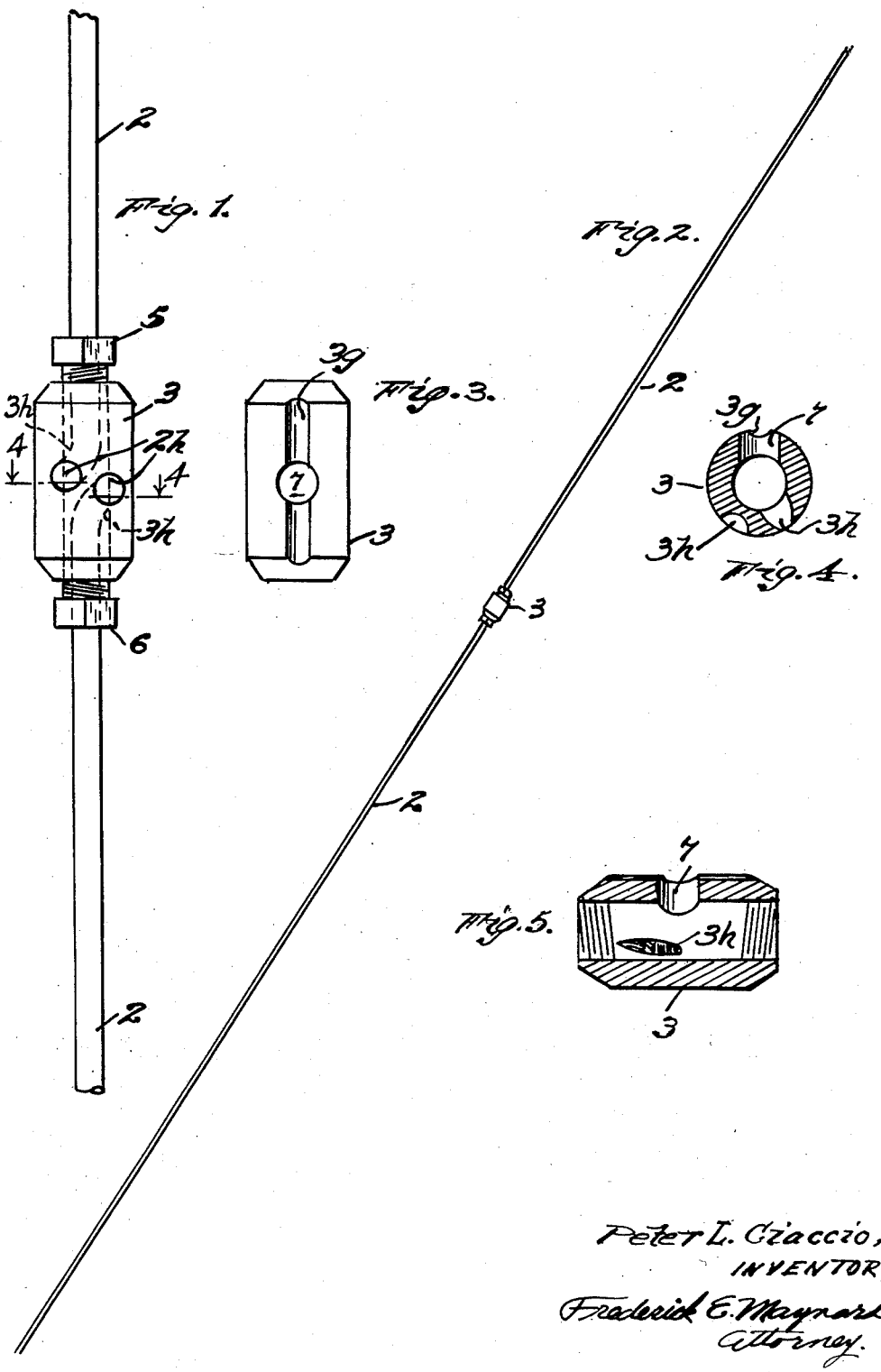
Peter L. Ciaccio,
INVENTOR;
Frederick E. Maynard,
Attorney.

United States Patent Office 2,793,060
Patented May 21, 1957

2,793,060
COUPLERS FOR FLEXIBLE SEWER ROD TRAINS

Peter L. Ciaccio, Los Angeles, Calif., assignor to Flexible Sewer Rod Equipment Company, Los Angeles, Calif., a partnership Application June 15, 1953, Serial No. 361,634

1 Claim. (Cl. 287—105)

This invention relates to improvements in a coupler of the well known type used for connecting the contiguous ends of elongated, flexible and resilient rods for sewer or tube cleaning devices.

Such rod trains are pushed and pulled, and rotated in bores of considerable length with many bends, and it is an object of this invention to provide a very short body type coupler that will enable the practical, reliable and efficient use of such equipment in short radius bore bends and in bores of small diameter. It is a purpose of the invention to provide for a substantial reduction in operational friction by reason of the short length of the coupler body, and further, to secure a coupler body which is improved over the old types by being less internally cut out and therefore has greater body strength to take the severe operational strains incurred in work jobs.

Also an intent of the invention is to eliminate the heretofore used diametrical wrench receiving hole and in its place provide a wrench socket radially in one side of the body only.

The invention resides in certain advancements in this art as set forth in the ensuing disclosure and having, with the above, additional objects and advantages as will be made manifest in the following description of the structure and its details and manner of operation; it being understood that modifications, variations, adaptations and equivalents may be resorted to within the scope, spirit and principles of the invention as it is claimed in conclusion hereof.

Figure 1 is a side elevational view of an assembled coupling. Figure 2 is a plan view of lengths of coupled rods. Figure 3 is a side elevational view of the coupler body, showing the reverse side from that visible in Figure 1. Figure 4 is a cross-section of the coupler body taken generally on line 4—4 of Figure 1. Figure 5 is a longitudinal sectional view of the coupler body.

Fig. 1 is about full scale size and illustrates ends of rods 2 which have elbow hooks 2h inclosed in opposite ends of a coupler body 3 which is preferably tubular, as shown in Fig. 4. Right and left hand threaded sleeve members 5 and 6 for respective ends of the body 3 secure the hooked ends of the rods in place in the body.

A distinctive feature of this invention is the provision of radially terminating elbow holes 3h in which the hooked ends of the rods lodge; these holes being so located that they both come to the same side surface of the body, as shown in Fig. 1, and they lie in peripheral zones around the body which overlap longitudinally of the body 3 so that the holes 3h reach a little past each other from opposite directions. This is clearly evident in Fig. 1. This peripheral staggering of the terminals of these holes enables production of this short form of body and gives the great advantage of negotiating small radius bore bends with greatly reduced friction and increases the overall flexibility of the rod train.

In some uses of these made-up trains it is necessary to turn the train of rods by a hand wrench provided with a spanner lug. The coupler body 3 is therefore provided with a spanner lug receiving socket 7 extending outwardly radially in only one side of the body, as shown in Figs. 4 and 5, thus conserving the metal for maximum strength. A longitudinal, external groove 3g leads from each end of the body to the socket 7 to facilitate applying a wrench for operation.

What is claimed is:

In a sewer rod assembly: a pair of axially aligned sewer rods each having at the adjacent ends thereof a short elbow shaped bend terminating in a laterally extending portion; a coupler body having an axial bore extending therethrough, a pair of curved bores extending laterally from said axial bore and terminating at their outer ends in openings through the outer surface of the body, each of said curved bores including a radially extending terminal portion, said radially extending terminal portions overlapping longitudinally of the body and being spaced closely together peripherally of the body to occupy positions on substantially the same side of said body, the elbow shaped bends of said rods being received in the respective curved bores, said axial bore having relatively short, internally threaded outer end portions; and externally threaded tubular sleeve members slidably received on the respective rods and threaded into the threaded portions of the axial bore.

References Cited in the file of this patent

UNITED STATES PATENTS

| 1,459,869 | Allen | June 26, 1923 |
| 1,797,087 | Hover | Mar. 17, 1931 |
| 1,901,168 | Kalben | Mar. 14, 1933 |
| 2,110,202 | Crane | Mar. 8, 1938 |

FOREIGN PATENTS

| 119,444 | Sweden | Aug. 12, 1947 |
| 140,375 | Australia | Mar. 2, 1951 |
| 662,859 | Germany | July 26, 1938 |